(12) United States Patent
Krakenberg et al.

(10) Patent No.: US 6,617,391 B2
(45) Date of Patent: Sep. 9, 2003

(54) LINEAR POLYDIALKYLORGANOSILOXANES HAVING POLYOXYALKYLENE AND AMINO-FUNCTIONAL GROUPS WHICH ADDITIONALLY HAVE TERMINAL ALKOXY GROUPS

(75) Inventors: Manfred Krakenberg, Essen (DE); Holger Leidreiter, Hattingen (DE); Sascha Oestreich, Essen (DE); Stefan Stadtmuller, Dornbuschhegge (DE); Akfred Walter, Essen (DE)

(73) Assignee: Goldschmidt AG, Essen (DE)

( * ) Notice: Subject to any disclaimer, the term of this patent is extended or adjusted under 35 U.S.C. 154(b) by 0 days.

(21) Appl. No.: 09/887,184

(22) Filed: Jun. 21, 2001

(65) Prior Publication Data

US 2002/0028900 A1 Mar. 7, 2002

(30) Foreign Application Priority Data

Jul. 18, 2000 (DE) .......................................... 100 34 777

(51) Int. Cl.$^7$ ................................................ C08L 83/12
(52) U.S. Cl. ........................ 524/588; 556/444; 556/445; 556/413; 556/424; 556/460; 525/477; 528/34; 528/38; 528/37; 528/12; 510/122
(58) Field of Search ................................. 556/444, 445, 556/413, 424, 460; 525/477; 528/38, 37, 12, 34; 510/122; 524/588

(56) References Cited

U.S. PATENT DOCUMENTS 4,680,366 A  *  7/1987   Tanaka et al.
5,075,403 A     12/1991  Kirk

* cited by examiner

*Primary Examiner*—Robert Dawson
*Assistant Examiner*—Kuo-Liang Peng
(74) *Attorney, Agent, or Firm*—Scully, Scott, Murphy & Presser

(57) ABSTRACT

The present invention relates to linear polyalkylorganosiloxanes having polyoxyalkylene and amino-functional groups which additionally have terminal alkoxy groups, and to the preparation and use thereof.

10 Claims, No Drawings

LINEAR POLYDIALKYLORGANOSILOXANES HAVING POLYOXYALKYLENE AND AMINO-FUNCTIONAL GROUPS WHICH ADDITIONALLY HAVE TERMINAL ALKOXY GROUPS

The present invention relates to linear polyalkylorganosiloxanes having polyoxyalkylene and amino-functional groups which additionally have terminal alkoxy groups, and to the preparation and use thereof.

It is known that aminosiloxanes having primary and secondary nitrogen groups and sometimes reactive silanol groups are incorporated as conditioning agents into hair shampoo formulations. These products are in most cases in the form of a mixture with the aid of surface-active substances in water. Purely in their original form, they are not soluble in water. They are solubilized in water by surface-active substances (emulsifiers, for example primary, multiple, secondary or tertiary surfactant systems) and converted into an aqueous emulsion. These surface-active substances usually consist of ethoxylated fatty alcohols, ethoxylated glycerides, fatty acid esters or similar products. Various products are available commercially, in particular from Dow Corning under the names DC 929, DC 949 and DCQ 2-8220. Products which as such are not soluble in water without the addition of surface-active substances are also available commercially from General Electric, e.g. under the name SME 253.

In order to improve the solubility in water, the aminosiloxanes can additionally be substituted by polyoxyalkylene groups. For example, U.S. Pat. No. 5,075,403 describes polydialkylorganosiloxanes which carry amino and polyoxyalkylene groups. Such products are prepared by cohydrosilylation of allylamines and allyl polyethers to hydridopolydimethylsiloxanes. However, it is observed here that the hydrosilylation reaction often does not achieve the desired conversions and so the desired degree of modification along the polydimethylsiloxane chain cannot be established.

It is also observed that aminosiloxanes which carry additional polyoxyalkylene groups for the most part remain in the aqueous phase upon use and do not attach to the hair in the desired manner.

In addition, in the case of aminosiloxanes, it is generally observed that an unpleasant odor adheres to the products as a result of the liberation of traces of volatile amines. These odors are undesired in the field of cosmetics. If attempts are made to remove the odor by distillation, it is generally observed that the unpleasant odor returns after a short period.

The object of the present invention was to prepare conditioning agents based on hydrophilic polydialkylorganosiloxanes which contain aminosiloxane groups, have a mild odor and exhibit lasting conditioning properties within the hair.

Surprisingly, it has been found that linear polyalkylorgano-siloxanes having polyoxyalkylene and amino-functional groups which additionally have terminal alkoxy groups exhibit a greatly improved hydrophilicity and have excellent conditioning properties.

It has also been found that the synthesis of linear polyalkylorganosiloxanes having polyoxyalkylene and amino-functional groups by alkaline equilibration leads to products having terminal alkoxy groups and problems with incomplete conversions are avoided.

The present invention thus provides linear polydialkylorganosiloxanes having polyoxyalkylene and amino-functional groups which additionally have terminal alkoxy groups, of the general formula (I)

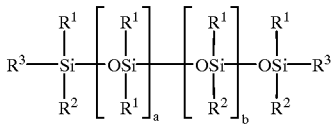

where
a=5 to 500 and
b=1 to 100 and
the radicals
$R^1$=identical or different aliphatic or aromatic hydrocarbon radicals having up to 8 carbon atoms,
$R^2=R^1$, $R^{2a}$ or $R^{2b}$, with the proviso that on statistical average a radical $R^{2a}$ is present in at least every tenth siloxane chain, and at least one radical $R^{2b}$ is present in each siloxane chain, where
the radical $R^{2a}$ is chosen from the radicals of an amino-functional group of the general formula (II)

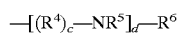

where
$R^4$=a divalent $C_1$ to $C_{12}$ hydrocarbon radical, an —OCH$_2$CH$_2$— group or an OCH$_2$CH(CH$_3$)— group,
$R^5$=a monovalent $C_1$ to $C_{12}$ hydrocarbon radical or a hydrogen atom,
$R^6$=a monovalent aliphatic or aromatic, optionally substituted $C_1$ to $C_{12}$ hydrocarbon radical or a hydrogen atom,
where
c=1 to 10
d=1 to 5,
the radical $R^{2b}$ is a polyoxyalkylene group of the general formula (III)

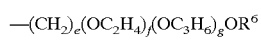

where
e=2 to 10
f2 to 20
g=0 to 20 and
$R^3=R^1$ or a group of the general formula (IV)

with the proviso that on statistical average at least one radical of the general formula (IV) is present on the siloxane backbone.

The present invention further describes the synthesis of hydrophilic polysiloxanes to which amino and polyoxyalkylene chains are linked at the same time via Si—C bonds.

In a preferred embodiment of the present invention, the polyalkylorganosiloxanes are those in which
a=a number in the range from 5 to 100, in particular 10 to 50,
b=a number in the range from 3 to 50, in particular 3 to 30 and
c=a number in the range from 1 to 10, in particular 1 to 6.

For the purposes of the present invention, particular preference is given to polydialkylorganosiloxanes where in the general formula (I) the radical $R^1$ is a methyl radical.

As stated above, it is a necessary condition that on statistical average at least one of the groups $R^{2b}$ and $R^3$=—$OR^1$ is present in each molecule of the polydialkylorganosiloxanes, and a radical $R^{2a}$ is present at least in every tenth siloxane chain. For the purposes of the present invention, it is particularly preferred if the molar ratio of the groups $R^{2a}$ to $R^{2b}$ to $R^3$=—$OR^1$ is 0.5 to 2 to 1.

A further preferred embodiment of the present invention consists in the process for the preparation of the polyalkyldiorganosiloxanes defined above. For the purposes of the present invention, the latter are prepared, for example, by equilibrating a mixture of a suitable polyethersiloxane of the general formula

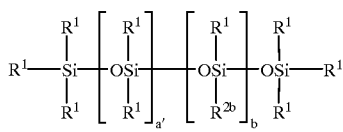

and/or a cyclic polyethersiloxane of the general formula

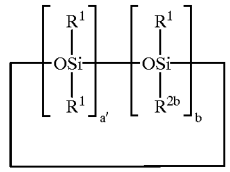

where $R^1$, $R^{2b}$ and b are as defined above and a' =0 to 500, a suitable dialkoxyaminosilane and/or its partial hydrolyzate, optionally octamethylcyclotetrasiloxane and/or decamethylcyclopentasiloxane using a basic catalyst.

The basic catalysts are, in particular, catalysts, such as alkali metal hydroxides, in particular sodium, potassium and cesium hydroxides, alkali metal alkoxides, quaternary ammonium hydroxides, such as tetramethylammonium hydroxide, benzyltrimethylammonium hydroxide, benzyltriethylammonium hydroxide, benzyltrimethylammonium butoxide, β-hydroxyethyltrimethylammonium 2-ethylhexoate, quaternary phosphonium hydroxides, such as tetra-n-butylphosphonium hydroxide and tri-n-butyl-3-[tris(trimethylsiloxy)silyl]-n-propylphosphonium hydroxide, alkali metal siloxanolates and ammonium organosiloxanolates, such as benzyltrimethylammonium siloxanolate and tetramethylammonium siloxanolate.

Use is preferably made of 10 ppm to 1% by weight, in particular 50 to 2 000 ppm, of basic catalyst, in each case based on the weight of the total mixture.

The dialkoxyaminosilanes preferably have the general formula $(R^1)(R^1O)_2Si(R^{2a})$ in which $R^1$, $R^{2a}$ are as defined above.

Examples of dialkoxyaminosilanes are N-aminoethyl-3-aminopropylmethyldimethoxysilane, N-aminoethyl-3-aminopropylmethyldiethoxysilane, 3-aminopropylmethyldimethoxysilane and/or 3-aminopropylmethyldiethoxysilane.

Partial hydrolyzates of the dialkoxyaminosilanes are prepared in a preceding reaction step by condensation of the aminosilanes with water, those partial hydrolyzates having up to 30 silicon atoms being preferred.

Also described is the use of the compounds according to the invention for the preparation of haircare formulations, such as conditioning formulations ("conditioners"), hair rinses, conditioning shampoos, and conditioning agents which remain in the hair following application ("leave-in" products). The present invention likewise relates to the use of the compounds according to the invention for the treatment of textile surfaces and of natural and/or synthetic fibers and/or "nonwoven" materials, in particular for improving the soft feel and the hydrophilicity.

The polydialkylorganosiloxanes according to the invention are also suitable for the preparation of surface-active formulations, where the surfactant is chosen from the group of anionic surfactants, cationic surfactants, nonionic surfactants and/or amphoteric surfactants.

The polydialkylorganosiloxanes according to the invention have only a low tendency to form nitroamines, even in the presence of primary or secondary amines.

EXAMPLE 1

General Preparation Procedure for the Examples According to the Invention 480.7 g of the polyethersiloxane having the following average structure

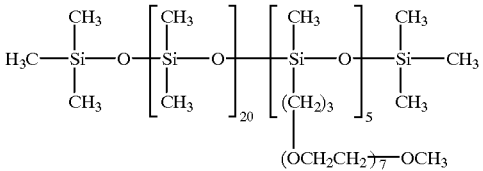

50 g of 3-aminopropylmethyldiethoxysilane, 493.6 g of octa-methylcyclotetrasiloxane and 0.1% by weight of tetramethylammonium hydroxide×5 water of crystallization were introduced into a 2 l three-necked flask fitted with a stirrer, high-efficiency condenser, thermometer and dropping funnel, and stirred at 90° C. for 5 hours. The mixture was then heated at 150° C. for 2 hours in order to destroy the catalyst. The volatile constituents were then separated off (130° C./10 mm). The product was filtered after cooling to room temperature. This gave a pale yellow, clear liquid with a viscosity of about 60 mPas [25° C.] and a nitrogen content of 0.356%.

Comparative Example 1

100 g of a silicone oil with a viscosity of 1 000 mPas were mixed with 4.5 g of 3-aminopropylmethyldiethoxysilane and 0.1 g of a basic catalyst. This gave a whitish cloudy mixture. With stirring, the mixture was heated to 90° C. After stirring for 5 h, the temperature was increased to 130° C. and volatile constituents were removed by applying a vacuum. This gave a clear product with a viscosity of 80 mPas and a nitrogen content of 0.32%.

Comparative Example 2

Commercially available cetyltrimethylammonium chloride was used as comparative example 2.

Comparative Example 3

A cationic aminosiloxane emulsion DC949 from the manufacturer Dow Corning was used as comparative example 3.

Comparative Example 4

For the direct cohydrosilylation of aminopolyethersiloxanes, 267 g of a hydridosiloxane having the following average formula

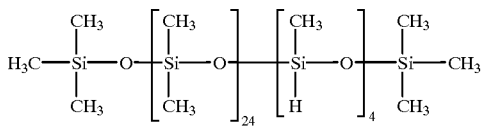

together with 240 g of an allyl polyether having the following general formula

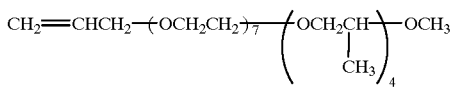

and 14.3 g of allylamine were heated to 135° C. in the presence of 10 mg of cis-Pt(NH$_3$)$_2$Cl$_2$ with stirring and stirred at this temperature for 8 h. After 8 h, 98% conversion was achieved (based on SiH). The yellow product was then distilled at 135° C. in an oil-pump vacuum. This gave a product with a viscosity of 75 mPas and a nitrogen content of 0.36%.

Preparation Example 1

16.5 g of a polyethersiloxane having the average structure

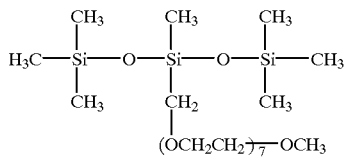

were mixed with 75 g of octamethylcyclotetrasiloxane, 5.6 g of 3-aminopropylmethyldiethoxysilane and 0.1 g of a basic catalyst. This gave a whitish cloudy mixture. With stirring, the mixture was heated to 90° C. After stirring for 5 h, the temperature was increased to 130° C. and volatile constituents were removed by applying a vacuum. This gave a clear product with a viscosity of 60 mPas and a nitrogen content of 0.39%.

Preparation Example 2

16.5 g of a polyethersiloxane having the average structure

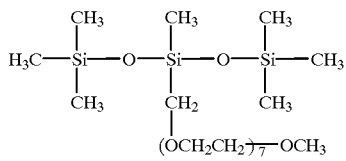

were mixed with 75 g of octamethylcyclotetrasiloxane, 8.0 g of N-(2-aminoethyl-3-aminopropyl) methyldimethoxysilane and 0.1 g of a basic catalyst. This gave a whitish cloudy mixture. With stirring, the mixture was heated to 90° C. After stirring for 5 h, the temperature was increased to 130° C. and volatile constituents were removed by applying a vacuum. This gave a clear product with a viscosity of 67 mPas and a nitrogen content of 0.39%.

Preparation Example 3

62.7 g of a polyethersiloxane having the average structure

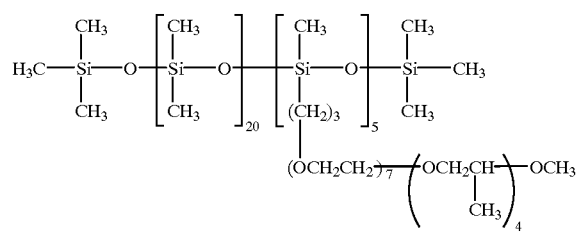

were mixed with 31.5 g of octamethylcyclotetrasiloxane, 5.8 g of 3-aminopropylmethyldiethoxysilane and 0.1 g of a basic catalyst. This gave a whitish cloudy mixture. With stirring, the mixture was heated to 90° C. After stirring for 5 h, the temperature was increased to 130° C. and volatile constituents were removed by applying a vacuum. This gave a clear product with a viscosity of 55 mPas and a nitrogen content of 0.37%.

Preparation Example 4

62.7 g of a polyethersiloxane having the average structure

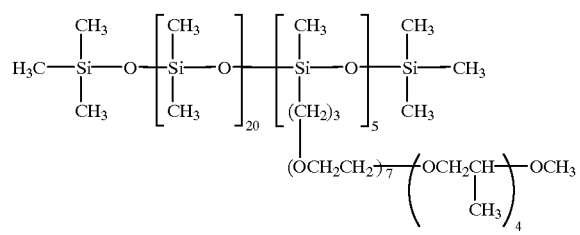

were mixed with 31.5 g of octamethylcyclotetrasiloxane, with 4.6 g of a partial hydrolyzate of 3-aminopropylmethyldiethoxysilane having the average structure

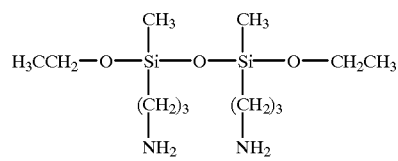

and 0.1 g of a basic catalyst. This gave a whitish cloudy mixture. With stirring, the mixture was heated to 90° C. After stirring for 5 h, the temperature was increased to 130° C. and volatile constituents were removed by applying a vacuum. This gave a clear product with a viscosity of 87 mPas and a nitrogen content of 0.36%.

Application Examples

For the applications-relevant assessment, hair tresses which have been used for sensory tests were predamaged in a standardized manner by a permanent waving treatment and a bleaching treatment. For this purpose, customary hairdressing products were used.

Materials

Permanent waving liquid (ondi®, Wella)
Neutralizer (neutrafix®, Wella)
Bleaching powder (blondor special®, Wella)
$H_2O_2$ (Welloxyd 9%®, Wella)
Shampoo without care component (e.g. sodium lauryl ether sulfate (12% washing-active substance), NaCl thickened)
Beakers
Hair coloring brush
The treatment was carried out in the following order:

1. Permanent Waving Treatment

The hair tresses were moistened with the permanent waving liquid (weight ratio of hair:liquid=1:2). After a contact time of 15 min at room temperature in a covered beaker, the permanent waving liquid was carefully rinsed out for 2 min. The hair tresses were then gently pressed using a hand towel.

The neutralizer (weight ratio of hair:liquid=1:2) had a contact time of 10 min at room temperature. The neutralizer was then carefully rinsed out for 2 min.

The hair was then dried overnight at room temperature.

2. Bleaching Treatment

The bleaching powder and the $H_2O_2$ were formulated to give a paste (weight ratio of powder:$H_2O_2$=2:3). The paste was then carefully applied to the perm treated hair using a brush. The contact time was 30 min at room temperature. The bleaching paste was then rinsed out under running water for 2 min.

The hair was then washed with a shampoo without conditioner for 1 min (amount of shampoo: 0.5 ml/hair tress) and then rinsed out for 1 min.

Before being used for sensory tests, the predamaged hair locks were dried overnight at room temperature.

Test Formulation

The conditioning products were tested in a simple hair rinse having the following composition

| Product | weight ratio |
| --- | --- |
| TEGINACID ®C | 0.5% |
| Ceteareth-25 | |
| TEGO ®Alkanol 16 | 2.0% |
| Cetyl Alcohol | |
| "Conditioner" | 2.0% |
| Water | ad. 100% |
| Citric acid | ad. pH 4.0 ± 0.3 |

"Conditioners" are the products obtained in the preparation examples and comparative examples.

Standardized Treatment of Predamaged Hair Tresses with Conditioning Samples

The predamaged hair tresses as described above were treated as follows with the above-described conditioning rinse:

The hair tresses were wetted under running, warm water. The excess water was gently squeezed out by hand, then the rinse was applied and gently incorporated into the hair (1 ml/hair lock (2 g)). After a contact time of 1 min, rinsing was carried out for 1 min.

Prior to the sensory assessment, the hair was dried in the air at 50% atmospheric humidity and 25° C. for at least 12 h.

Assessment Criteria

The sensory evaluations were made using grades given on a scale from 1 to 5, 1 being the poorest evaluation and 5 being the best evaluation.

| Wet combability | | |
| --- | --- | --- |
| 5 | coarse toothing [of the comb] | No knots, the hair can be detangled easily. |
| | fine toothing | Very easy to comb through, no resistance detectable. |
| 4 | coarse toothing | Individual knots. The hair can be detangled easily. |
| | fine toothing | Easy to comb through, slight resistance detectable. |
| 3 | coarse toothing | A few knots, slight resistance. |
| | fine toothing | Some degree of resistance detectable, which decreases after repeated combing. |
| 2 | coarse toothing | Some knots, notable resistance. |
| | fine toothing | Notable resistance which does not decrease after repeated combing. |
| 1 | coarse toothing | Many knots, severe resistance. |
| | fine toothing | Very severe resistance, sometimes the hair cannot be combed through. |

| Wet feel | |
| --- | --- |
| 5 | Very smooth, soft but nevertheless beautifully strong, of good feel, not greasy/tacky (no residues detectable) |
| 4 | Smooth and soft and/or only slight residues detectable |
| 3 | Smooth, somewhat hard and/or some residues detectable |
| 2 | Hard and/or notable greasy, waxy residues |
| 1 | Very hard, rough, harsh and/or extremely greasy, tacky (clearly detectable greasy, waxy residues detectable) |

| Dry combability | | |
| --- | --- | --- |
| 5 | coarse toothing | No knots, the hair can be detangled easily |
| | fine toothing | Very easy to comb through, no resistance detectable, the hair does not become charged |
| 4 | coarse toothing | Individual knots. The hair can be detangled easily |
| | fine toothing | Easy to comb through, no resistance detectable, the hair becomes charged to a minimum degree |
| 3 | coarse toothing | A few knots, slight resistance |
| | fine toothing | Some resistance detectable which decreases after repeated combing, the hair becomes slightly charged |
| 2 | coarse toothing | Some knots, notable resistance |
| | fine toothing | Notable resistance which does not decrease after repeated combing, the hair becomes charged |
| 1 | coarse toothing | Many knots, severe resistance |
| | fine toothing | Very severe resistance, sometimes the hair cannot be combed through, the hair becomes considerably charged |

| Dry feel | |
| --- | --- |
| 5 | Very smooth, soft but nevertheless strong, full, of good feel |
| 4 | Smooth and soft |

-continued

| | Dry feel |
|---|---|
| 3 | Smooth, slightly hard and/or slightly harsh (residues) |
| 2 | Hard, somewhat harsh |
| 1 | Rough, hard, dry, harsh (residues) |

| | Dry appearance |
|---|---|
| 5 | Extremely shiny |
| 4 | Shiny |
| 3 | Somewhat shiny |
| 2 | Slightly shiny, slightly harsh |
| 1 | Harsh, no shine |

Volume

In order to assess the volume, the hair locks were shaken gently by holding them at the bonding point.

| | |
|---|---|
| 5 | Loose, bulky drop, Ø in the tip area rel. large |
| 4–2 | Intermediate stages |
| 1 | Hair hangs heavily downward, Ø below the bundling similar to the tip area |

In the table below the results of the sensory assessment of the treatment of hair tresses carried out as described above with aminopropylsiloxane copolyols according to the invention and comparative examples are compared.

| Ranking | Conditioner | Detangling | Wet combability | Wet feel | Dry combability | Dry feel | Shine | Volume | Fly-away |
|---|---|---|---|---|---|---|---|---|---|
| 1 | Comparative Example 2 | 4.75 | 5 | 4.25 | 5 | 4.5 | 3.5 | 3 | 10 |
| 2 | Preparation Example 3 | 4.75 | 5 | 4.25 | 4.25 | 3.5 | 3 | 3.75 | 19 |
| 5 | Comparative Example 3 | 3 | 3 | 3 | 3.5 | 4.25 | 3.75 | 1.5 | 22.5 |
| 3 | Preparation Example 4 | 5 | 4.5 | 3.5 | 3.75 | 2.75 | 3 | 4.25 | 18 |
| 6 | Preparation Example 1 | 2.25 | 2.5 | 2.75 | 3.75 | 3.5 | 3.5 | 3.75 | 35 |
| 7 | Preparation Example 2 | 1.75 | 3.25 | 2 | 3.75 | 3 | 3.5 | 2.5 | 40.5 |
| 4 | Comparative Example 4 | 4.5 | 4.5 | 3.75 | 4 | 3 | 3.5 | 2.75 | 22 |
| 8 | Comparative Example 1 | 2.5 | 3.25 | 3.5 | 4.5 | 4 | 4 | 2.75 | 43 |
| 9 | Control (Placebo) | 1.5 | 1.25 | 1.75 | 2.75 | 2.75 | 3 | 1.5 | 50 |

It was found that the novel linear polyalkylorganosiloxanes with polyoxyalkylene and amino-functional groups which additionally have terminal alkoxy groups achieved considerably better evaluations than the polyether-free and alkoxy-free aminosiloxanes in the sensory assessment.

What is claimed is:

1. A linear polydialkylorganosiloxane having polyoxyalkylene and amino-functional groups which additionally has terminal alkoxy groups, of the general formula (I)

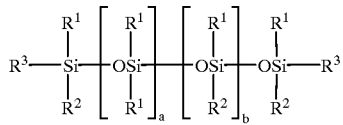

where
a=5 to 500,
b=1 to 100,
the radicals
$R^1$=identical or different aliphatic or aromatic hydrocarbon radicals having up to 8 carbon atoms, and
$R^2$=$R^1$, $R^{2a}$ or $R^{2b}$, with the proviso that on statistical average a radical $R^{2a}$ is present in at least every tenth siloxane repeating unit, and at least one radical $R^{2b}$ is present in each siloxane repeating unit,
where
the radical $R^{2a}$ is selected from the radicals of an aminofunctional group of the general formula (II)

where
$R^4$=a divalent $C_1$ to $C_{12}$ hydrocarbon radical, an —OCH$_2$CH$_2$— group or an OCH$_2$CH(CH$_3$)— group,
$R^5$=a monovalent $C_1$ to $C_{12}$ hydrocarbon radical or a hydrogen atom,
$R^6$=a monovalent aliphatic or aromatic, optionally substituted $C_1$ to $C_{12}$ hydrocarbon radical or a hydrogen atom,
where
c=1 to 10, and
d=1 to 5, the radical $R^{2b}$ is a polyoxyalkylene group of the general formula (III)

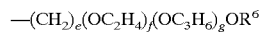

where
e=2 to 10,
f=2 to 20,
g=0 to 20,
and $R^3$=$R^1$ or a group of the general formula (IV)

with the proviso that on statistical average at least one radical of the general formula (IV) is present on the siloxane backbone.

2. The polydialkylorganosiloxane as claimed in claim 1, wherein
   a=a number in the range from 5 to 100,
   b=a number in the range from 3 to 50, and
   c=a number in the range from 1 to 10.

3. The polydialkylorganosiloxane as claimed in claim 1 or 2, wherein in the general formula (I) $R_1$=methyl.

4. The polydialkylorganosiloxane as claimed in claim 1, wherein the molar ratio of the groups $R^{2a}$ to $R^{2b}$ to $R^3$=—$OR^1$ is 0.5 to 2 to 1.

5. A process for the preparation of polydialkylorganosiloxanes as claimed in claim 1, which comprises equilibrating at least one polyethersiloxane of the general formula

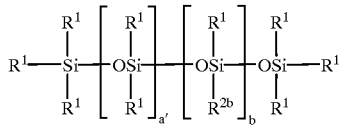

and/or a cyclic polyethersiloxane of the general formula

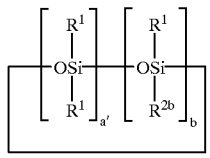

where $R^1$, $R^{2b}$ and $R^b$ are as defined in claim 1 and a'=0 to 500, and a dialkoxyaminosilane and/or its partial hydrolyzate, using a basic catalyst.

6. A haircare formulation comprising at least the polydialkylorganosiloxane of claim 1.

7. A method for the treatment of natural and/or synthetic fibers and/or nonwoven materials comprising applying a polydialkylorganosiloxane of claim 1 to said materials.

8. A surface-active formulation comprising a surfactant selected from the group of anionic surfactants, catonic surfactants, nonionic surfactants and/or amphoteric surfactants, and a polydialkylorganosiloxane of claim 1.

9. The linear polydialkylorganosiloxane as claimed in claim 1, wherein a=a number in the range from 10 to 50, b=a number in the range from 3 to 30, and c=a number in the range from 1 to 6.

10. The process according to claim 5, wherein said equilibrating further comprises the presence of octamethylcyclotetrasiloxane, decamethylcyclopentasiloxane or a combination thereof.

\* \* \* \* \*

UNITED STATES PATENT AND TRADEMARK OFFICE
CERTIFICATE OF CORRECTION

PATENT NO. : 6,617,391 B2
DATED : September 9, 2003
INVENTOR(S) : Krakenberg et al.

It is certified that error appears in the above-identified patent and that said Letters Patent is hereby corrected as shown below:

<u>Title page,</u>
Item [*] Notice, delete the phrase "by 0 days" and insert -- by 132 days --

Signed and Sealed this

Fifth Day of October, 2004

JON W. DUDAS
*Director of the United States Patent and Trademark Office*